Nov. 12, 1935.   W. H. BRESNAHAN   2,020,288
APPARATUS FOR USE IN MAKING FOOTWEAR
Original Filed April 24, 1928   5 Sheets-Sheet 3

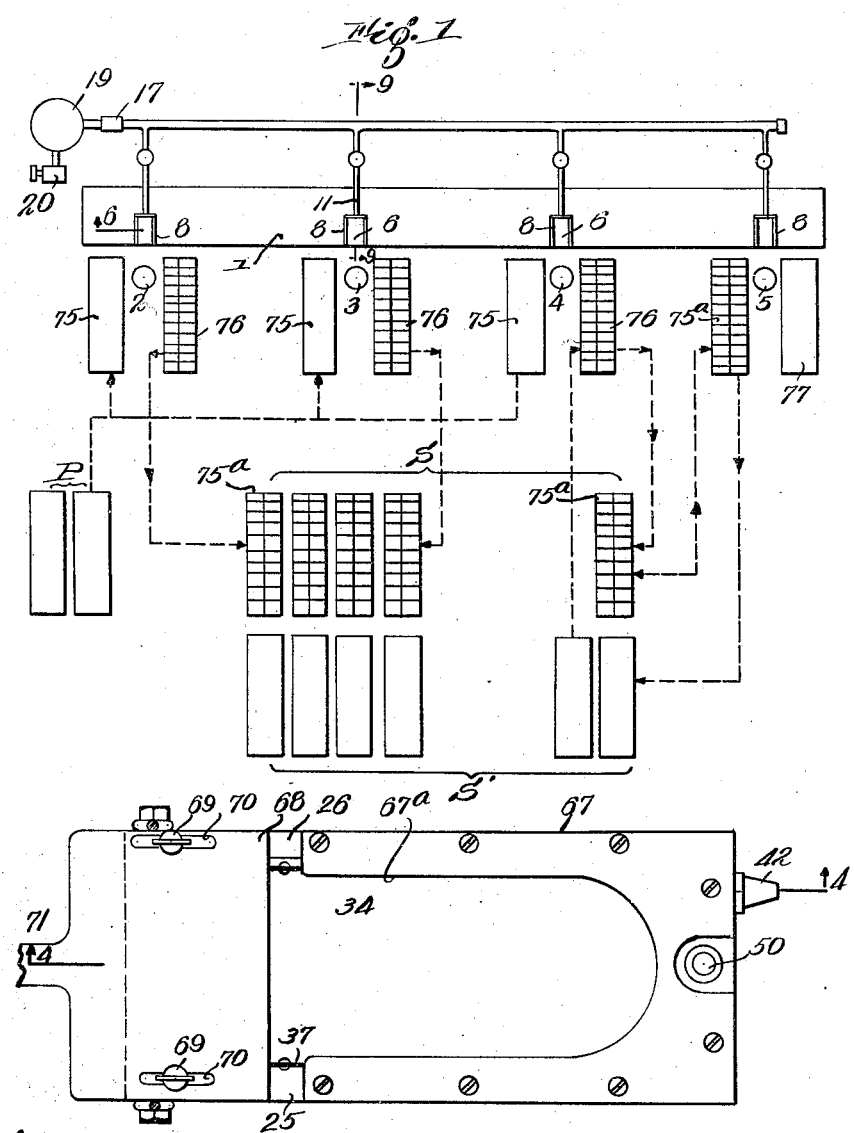

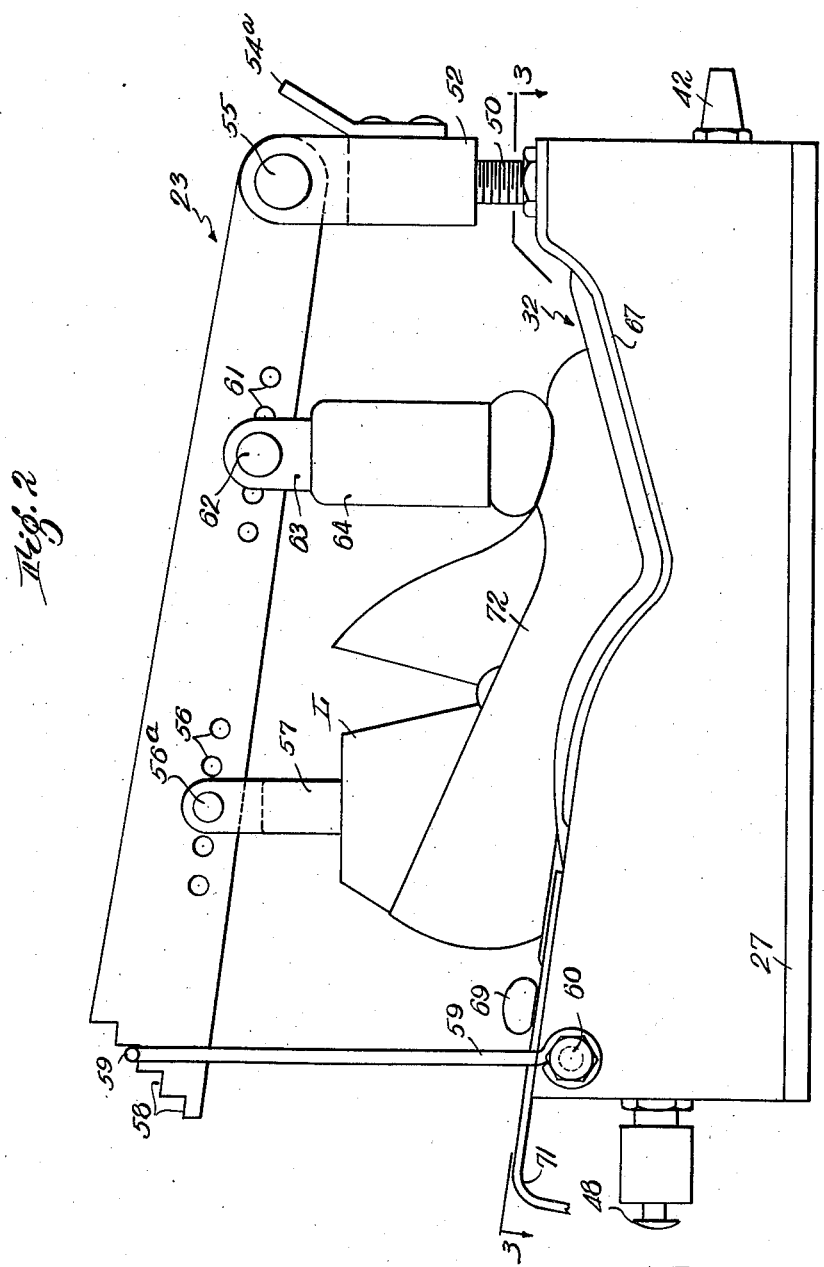

Inventor
William H. Bresnahan
By Roberts Cushman Woodberry
Attys.

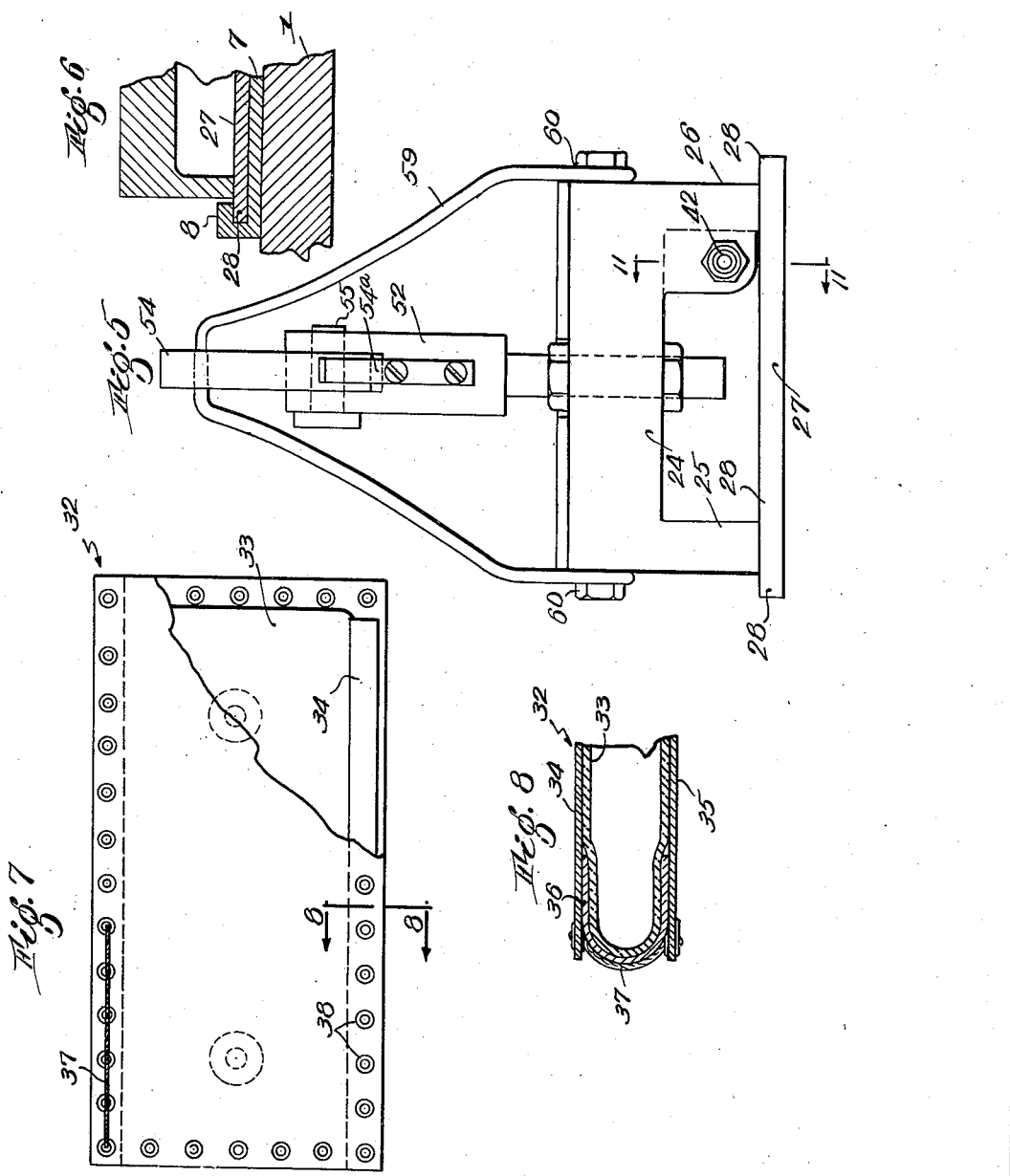

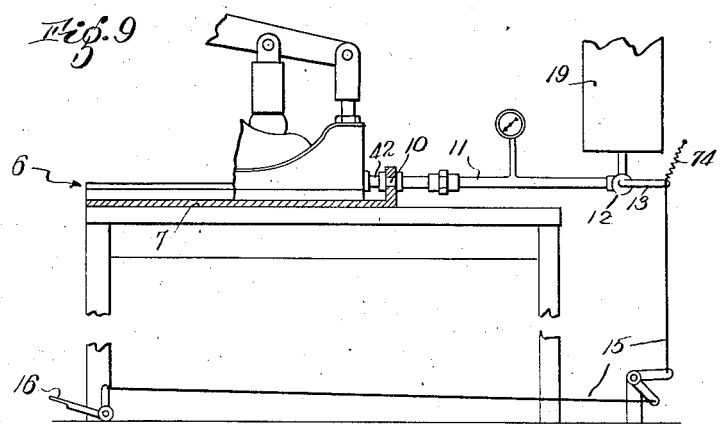
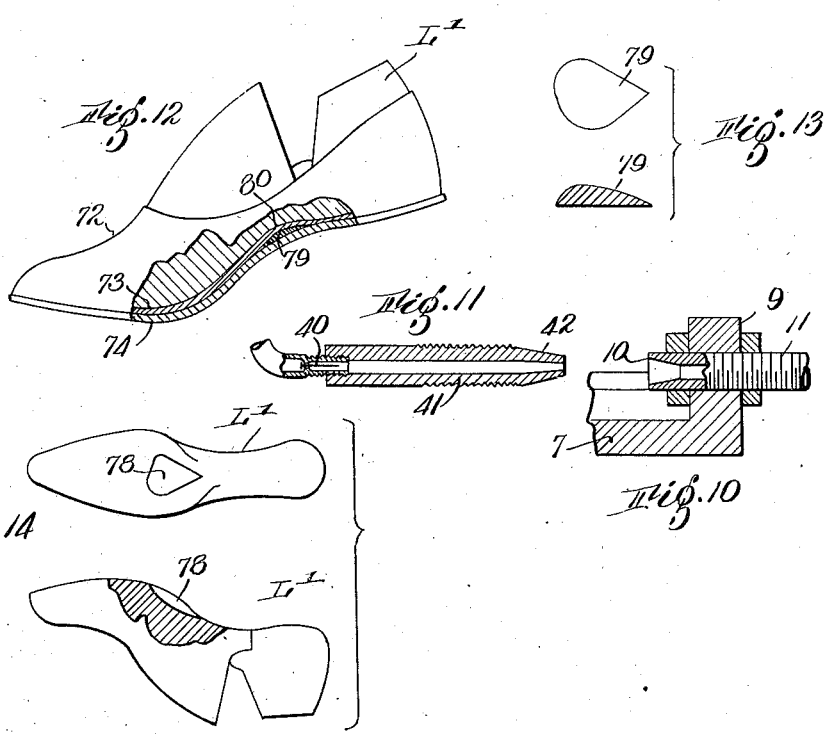

Patented Nov. 12, 1935

2,020,288

UNITED STATES PATENT OFFICE 2,020,288

APPARATUS FOR USE IN MAKING FOOTWEAR

William H. Bresnahan, Lynn, Mass., assignor, by mesne assignments, to Compo Shoe Machinery Corporation, New York, N. Y., a corporation of Delaware Original application April 24, 1928, Serial No. 272,449. Divided and this application December 6, 1928, Serial No. 324,276

20 Claims. (Cl. 12—33)

This invention pertains to the manufacture of footwear and more particularly to apparatus for use in making shoes of that type in which the outer sole is permanently secured in place by means of an adhesive cement instead of nails, tacks, stitches or similar fasteners. I am aware that apparatus has been devised for use in making shoes of this general type, and one such apparatus known to me comprises a series of molds or clamping devices arranged in fixed relation upon a rotary support, each mold having an inflatable pressure pad. The several pads are supplied from a common source of compressed air having a delivery pipe leading to the center of the series of molds. The operator places a shoe with its outer sole in one of the molds, clamps the shoe in place, admits compressed air from the supply to inflate the pads, and then turns the support to bring a new mold into position. Since it is necessary to allow the shoes to remain under compression in the molds for a considerable period, usually of the order of thirty minutes, it is clear that if all of the molds on the machine can be filled in less than thirty minutes, the machine must stand idle for the balance of the period, that is to say, until the first shoe to be treated has thoroughly dried. Limitation of space and the weight of the moving parts makes it impractical to build a machine having sufficient molds to keep an operator busy, and the largest machine of the type of which I have any knowledge has a maximum capacity of approximately 200 pairs of shoes per day. This is altogether too low an output to be profitable, taking into consideration the capital invested in the machine and the cost of labor for operating it. Furthermore, the molds heretofore provided for such machines are not of proper construction for best results and particularly when employed for securing the outer sole to women's shoes of the finer grade, the molding operation breaks down the heel seat so that the finished shoe shows a gap at the junction of the heel and sole.

It is an object of the present invention to provide an apparatus by which shoes can be manufactured in an efficient and economical manner, and, more particularly, to provide an apparatus including a plurality of individual and readily portable molds of the inflatable pressure pad type, which may be used in conjunction with a plurality of mold supports at which the inflatable pads may be readily inflated.

In accordance with the present invention I have devised an improved apparatus which enables me to attach shoe soles by means of adhesive in place of stitches, nails, or the like without substantial interference with or unusual delay in the orderly progress of the shoes through the factory according to usual systems of production; to perform the manual parts of the operation of attaching the soles at high speed (without loss of time by reason of limited machine capacity so that, for example, two workmen, in cooperation, can attach as many as 1400 pairs of soles per day); to attach the soles securely and without breakage of the heel seat or damage to the upper or sole of the shoe; and which enables me to make a shoe having an arch-supporting element, which adds but slightly to the cost of production and yet furnishes adequate support for the metatarsal arch of the foot.

The present application is a division of my copending application Serial No. 272,449, filed April 24, 1928, wherein I disclose and claim a novel process or method of making shoes which is conveniently practiced with the help of apparatus such as herein described and claimed. Since my novel method represents one utility for the apparatus herein claimed, I deem it desirable to describe said method herein.

Among other things my novel method comprises the use of independent portable molds each having an inflatable pressure pad, valved means for admitting compressed air to fill the pads and for releasing the air at the end of the operation, and clamping means for holding the shoe in the mold. Assuming that the opposed surfaces of the sole and shoe bottoms have been made adhesive in the usual manner, the operator brings the sole into proper registry with the shoe, sets the sole and shoe into the mold with the sole resting against the inflatable pad, adjusts the clamp to hold the shoe in position, connects the pad to an air supply whereby to inflate the pad to the desired degree, and then places the loaded mold upon a convenient support where it will not interfere with a repetition of the same operation upon another shoe. I prefer to place the loaded mold upon a wheeled rack of the general type employed in shoe manufacture for conveying shoes from one operating station to another (although a rack of especially strong or reinforced construction is desirable), and the operator may continue to fill molds and place them on the rack until the rack is full, whereupon the rack is wheeled away to a convenient storage space and left as long as is necessary to permit the adhesive to set thoroughly. Meanwhile, without waiting for the first rack of shoes to dry, the operator continues to load and inflate molds, placing the loaded molds upon another rack, and thus the operation may be continued without interruption throughout the day. Preferably, a second operator moves the racks of dry shoes from the storage space to an unloading station where he removes the loaded molds, one by one from the rack, releases the air pressure from the pad, unlocks the clamp and removes the shoe from the mold. The shoes, as removed from the molds, may conveniently be placed upon another rack, while the empty molds may be restored to the racks from which they were removed, and when all of the molds have been emptied, this rack, with the empty molds, may be returned to the filling position.

If it be desired to make a shoe having an arch support, I prefer to employ a last having a cavity in its bottom at a point corresponding to the desired position of the arch support, and before placing the shoe in the mold I introduce an arch-supporting pad of any suitable material between the sole and shoe bottom, locating it immediately below the hollow in the last. When pressure is applied for securing the sole to the bottom, the sole and bottom of the shoe are caused to conform closely to the bottom of the last, and the pad causes the inner sole to protrude into the cavity in the last, producing a hump or elevation in the upper surface of the shoe bottom. This hump or elevation constitutes a very effective arch support but does not detract from the appearance of the shoe, requires no special shaping of the outer sole or parts constituting the shoe bottom, and in accordance with this method may be applied without substantially increasing the cost of production.

In the accompanying drawings I have illustrated by way of example one desirable embodiment of the invention, and in the drawings Fig. 1 is a diagrammatic plan view showing a portion of a shoe factory equipped with apparatus in accordance with the present invention;

Fig. 2 is a side elevation of one of the individual molds which I find convenient in the practice of my process, certain parts being broken away;

Fig. 3 is a horizontal section, to smaller scale, on the line 3—3 of Fig. 2;

Fig. 5 is an end elevation looking from the right-hand side of Fig. 4;

Fig. 6 is a fragmentary vertical section, to large scale, on the line 6—6 of Fig. 1;

Fig. 7 is a plan view, partly broken away, of an inflatable pressure-applying element forming a part of my mold;

Fig. 8 is a fragmentary section, on the line 8—8 of Fig. 7, to larger scale, showing certain details of construction of the pressure-applying pad;

Fig. 9 is a fragmentary vertical section, to larger scale, substantially on the line 9—9 of Fig. 1;

Fig. 10 is a fragmentary vertical section on the same plane as Fig. 9 but showing certain details to larger scale;

Fig. 11 is a fragmentary vertical section substantially on the line 11—11 of Fig. 5 showing details of the air inlet tube;

Fig. 12 is a side elevation, partly in vertical section, of a shoe constructed in accordance with the present process, showing the shoe provided with an arch support;

Fig. 13 is a composite view showing in plan and vertical section an arch-supporting pad; and Fig. 14 is a composite view, showing in bottom plan and in vertical section, a last useful in making an arch-supporting shoe in accordance with my process.

Figure 4:
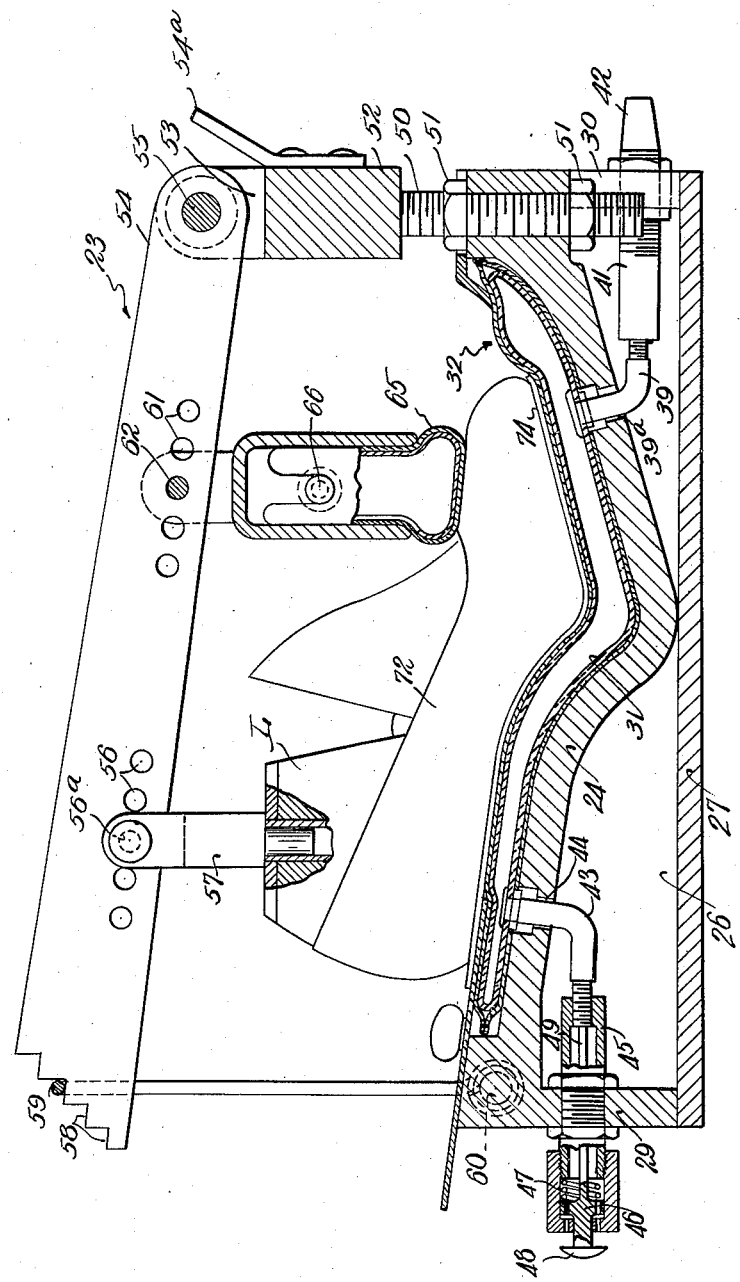
Fig. 4 is a vertical section, to substantially the same scale as Fig. 2, on the line 4—4 of Fig. 3.

Referring to Fig. 1, I have shown a work bench 1 which may be of any suitable and usual construction, and a series of operator stations 2, 3, 4 and 5, spaced at intervals along this bench. At each operator's station the bench is provided with a mold-supporting base plate 6 which is permanently secured to the bench in any desired manner. The base plate 6, as shown more particularly in Figs. 6, 9 and 11, comprises a bottom member 7 and substantially parallel side flanges having overhanging upper edges as shown at 8 which form a dovetail guideway for the molds hereinafter described. Each base plate 6 has a rear wall 9 provided with an aperture which receives the delivery terminal 10 of an air-supply pipe 11, said terminal 10 having an axial bore, which may, if desired, be flared at its outer end to form a socket. The pipe 11 is provided with a valve 12 provided with an actuating lever 13 normally held in closing position by the spring 14 and connected through suitable links and levers 15 to a pedal 16 disposed at the front of the bench and in convenient position for actuation by the foot of the operator. Each of the valves 12 is connected by means of a suitable pipe to a main 17 extending along the bench and receiving compressed air from a supply tank or reservoir 19. An air pump or compressor 20 keeps a constant supply of compressed air in the tank.

I provide a large number of individual molds 23, each of substantially the same construction, although they may be made in different sizes, if desired, to accommodate shoes of greatly differing size, for example, children's shoes and men's shoes. Each mold preferably comprises a top member 24 and side flanges 25 and 26. A bottom plate or foot 27 is secured to the lower edges of the side flanges and this bottom plate projects beyond the side flanges as shown at 28 to form tongues cooperating with dovetail guideway in the corresponding base plate mounted on the bench.

As here shown, each mold also comprises depending end members 29 and 30 for a purpose hereinafter described.

The top member 24 of the mold is provided with a cavity whose bottom preferably is shaped to conform substantially to the normal contour of the bottom of a shoe last. This cavity receives the pressure-applying pad 32. Preferably the pad comprises a fluid-tight expansible bag 33, preferably of rubber or other similar material, which is interposed between the top and bottom protecting members 34 and 35 (Fig. 8). These protecting members may be sheets of soft leather, rubber, or other suitable material adapted to protect the bag proper from abrasion. Preferably the top, bottom, and sides of the bag are of integral continuous construction and lateral edges of the bag are embraced by protective members 36 of leather or the like, whose edges are tucked in between the bag and the top and bottom members 34 and 35, respectively, and the top and bottom members are held in proper relation by means of a lacing cord or the like indicated at 37, preferably passing through eyelets 38 (Fig. 7) in the edges of the members 34 and 35.

The pad rests freely in the cavity in member 24, and preferably is not clamped or otherwise fixed in place. The pad is furnished with an inlet pipe 39 (Fig. 4) which extends down through an opening 39ª in the member 24 of the mold. This pipe contains a valve 40 of the type usually employed in pneumatic tires for preventing escape of air, such valve being indicated diagrammatically herein, since this detail construction forms no essential part of the present invention. Preferably a nipple 41, carried by the part 30 of the mold, is connected to the end of tube 39, said nipple having a tapered end 42.

The inflatable pad is also provided with an outlet pipe 43 extending downwardly through an opening 44 in the member 24 and this outlet pipe 43 is also provided with a valve (not shown) similar to the valve 40. The pipe 43 is connected to a casing 45, secured in the front member 29 of the mold, and this casing 45 contains a plunger 46 normally held in its forward position by means of a spring 47 and having an actuating handle 48 by means of which it may be pressed inwardly. This plunger has a stem member 49 which is adapted to engage the valve contained in the pipe 43, and when the plunger is pushed inwardly the valve is unseated, permitting air to escape from the pad.

A screw-threaded post 50 engages a screw-threaded opening in the rear portion of the mold, and is held in vertically adjusted position by means of lock nuts 51. This post has a head 52 which is slotted at 53 for the reception of the rear end of a lever 54 which is fulcrumed upon a pin 55 carried by the head 52. The head also carries a stop member 54ª against which the lever 54 may rest when the lever is thrown upwardly.

The lever 54 is provided with a series of openings 56 which are adapted selectively to receive a pivot 56ª for a last jack pin 57 adapted to enter the usual socket in a last L. The forward end of the lever 54 preferably is provided with a series of detents 58 adapted selectively for engagement with a bail 59 pivotally secured at 60 to the side walls 25 and 26 of the mold.

At a point intermediate the pivot pin 55 and the group of holes 56, I provide a second group of holes 61 adapted selectively to receive a pivot pin 62 supporting a forepart pad 63. This pad preferably comprises a housing 64, open at its bottom, adapted to receive a pneumatic pressure-applying bag 65 having an inlet tube 66 through which it may be inflated, such inlet tube having a valve (not shown) of the usual type employed in pneumatic tires.

Referring to Fig. 3 the mold preferably is provided with a guard comprising the fixed substantially V-shaped member 67 which is suitably secured to the upper edge of the mold proper, as by means of screws. The elongated opening in member 67, defined by the inner edge 67ª determines the area of the pressure-applying pad which is exposed to contact with the forepart of the shoe sole. The member 67, as sho./n in side elevation in Fig. 2, has a contour, in a longitudinal vertical plane, similar to that of a shoe last bottom, and following closely the contour of the bottom of the cavity in part 24. Thus, as shown in Fig. 4, the upper surface of the pad, when inflated, is constrained to conform, in a front to rear direction, very closely to the contour of the shoe last bottom.

While it is within the scope of my invention to continue this fixed member 67 around the entire margin of the mold cavity, I prefer to make the heel portion 68 of the guard so that it can be adjusted lengthwise of the mold. Preferably this part 68 is held in adjusted position by means of thumb screws 69 passing through elongate slots 70 in the plate. For convenience in adjustment this plate may be provided with a handle 71. The plate 68 covers that portion of the inflatable bags upon which the heel of the shoe rests, and as the plate is flat it prevents the edge portion of the heel piece from being rounded or broken when the shoe is submitted to pressure, so that when the heel is afterward applied it makes a close joint with the rear portion or heel piece of the sole.

Up to the point of attaching the outer sole, the shoe may be made following well-known methods of procedure. Thus the shoe comprises an upper 72 of any of the usual materials, cut to the desired pattern, and having its various parts sewed or otherwise united to form the complete upper. An inner sole 73 (Fig. 12) is also provided, such inner sole being of any desired material, for example, leather, and of proper thickness and contour, and this inner sole is placed upon the bottom surface of a last L and the upper is lasted over the last with its edges overlapping the inner sole. An outer sole 74 is also prepared, such outer sole being of suitable thickness and contour, and in accordance with a preferred method of practicing my present process the opposed surfaces of the inner and outer soles are coated, before assembling, with a suitable adhesive which is allowed to harden. Just before the outer sole is brought into registry with the inner sole, the coated surfaces of one or both of the sole members are treated with a solvent for the adhesive, whereby such opposed surfaces become sticky and in condition to be united.

Referring to Fig. 1, it is assumed that operators at the stations 2, 3 and 4 have the duty of loading or filling the molds, and the operator at the station 5 has the duty of emptying the molds. Referring now to the procedure at station 2, it is assumed that a rack 75, of the type commonly employed in shoe factories for transporting case lots of shoes from one operator to the next, is disposed at the left-hand side of the operator station 2, and that this rack contains lasted shoes, together with outer soles corresponding to the shoes. It is also assumed that at the right-hand side of the operator station 2, a rack 76 is arranged, carrying empty molds of the type above-described. Preferably this rack 76 is of special reinforced construction to enable it to support the weight of the molds. The same arrangement of racks 75 and 76 is seen at stations 3 and 4, the operators providing themselves with racks 75 from the supply indicated at P, and with racks 76 containing empty molds from the supply S¹.

The operator, at any of the stations 2, 3 or 4, removes an empty mold from the rack 76 and slides it into the base plate 8 on the bench 1, pushing it rearwardly until the conical end 42 of the nipple 41 seats snugly in the axial bore of the member 10.

The operator now throws back the lever 54 of the mold until it rests against the stop 54a. He then takes a shoe from the rack 75, together with the corresponding sole, and if the parts are not already adhesive, performs the necessary operation to make them so. He then places the sole in registry with the shoe bottom and sets the sole and shoe upon the inflatable pad 32, disposing the shoe symmetrically in the opening in the member 67, and with the heel seat portion of the shoe resting on the plate 68, it being assumed that the operator has set the plate 68 to the desired point of adjustment in accordance with the size of the shoe which is to be operated on. Having properly positioned the shoe upon the pad, the operator swings the lever 54 downwardly, bringing the pin 57 down into the socket in the last L, and causing the inflated pad 65 to rest on the forepart of the shoe. It will be understood that the pad 65 will be kept properly inflated at all times by admitting compressed air through the inlet 66 when necessary. The pin 57 and the pad-supporting member 63 are adjusted longitudinally of the lever 54 in accordance with the size of the shoe. The bail 59 is now swung upwardly and engaged with one of the detents 58 at the end of the lever 54, and the operator depresses the treadle 15, thus opening the valve 12 and admitting compressed air to the interior of the inflatable pad. The inflation of the pad causes it to bulge upwardly through the opening in the guard plate 67 and to compress the outer sole very snugly against the bottom of the shoe, the bulging of the pad at the edges of the sole causing the latter to make a tight joint with the upper. At the heel seat, where the plate 68 is interposed between the sole and the bag, the sole is maintained flat in a transverse direction, and although at this point the sole is not subjected to as great pressure as in the forepart, this is immaterial since the heel seat portion of the outer sole is secured in position, at a later stage in the shoemaking operation, by means of nails or tacks according to a common practice regardless of the method employed in securing the forepart of the outer sole in position.

By a proper manipulation of the treadle 16 the operator may admit more or less compressed air to the bag, and thus may secure the desired degress of inflation. When the bag is properly inflated, the operator releases the treadle 16, pulls the mold out from the base plate, and places it upon the rack 75. The operator continues to repeat the above operation with respect to shoes on the rack 75 until all such shoes have been placed in molds on the rack 76. This rack of filled molds is now wheeled to a convenient storage place, for example, the space indicated at S in Fig. 1, the racks of filled molds being indicated at 75ª. The racks remain in this storage position for such period of time as is necessary to insure thorough setting of the cement which unites the outer sole to the shoe. While the filled molds are thus in storage, the operator supplies himself with a fresh rack 75 of lasted shoes and a new rack of empty molds and continues the above operation, it being understood that operators at stations 2, 3 and 4 are likewise filling molds in the same way.

After a rack 75ª of filled molds has remained in storage for the proper time, the operator at the station 5 wheels it to a position at his left and secures an empty rack 77 of the usual type, which he places at his right. He then removes the filled mold from the rack 75ª, slides it into the base plate 6 at his station for convenience in holding it, and presses the handle 48 of the air relief valve, thus unseating the valve in the pipe 43 and permitting the air to escape from the pad. He then swings the bail 59 downwardly and turns the lever 54 back, thus releasing the shoe with its sole from the mold. He places the shoe on the rack 77 and restores the empty molds to the rack 75ª, the latter being returned to the storage position S¹ while the rack 77 of shoes, having their soles attached, is wheeled on to the next operator for such subsequent operation as is usual at this stage of the shoe manufacturing process.

If it be desired to provide the shoe with an arch support, I prefer to employ a last L¹, Fig. 14, having a cavity or depression 78 in its bottom surface at the point at which the arch support is desired. I also provide an arch-supporting pad 79 of rubber, leather, fiber or the like; and just before the shoe with its outer sole is placed in the mold, this pad is slipped between the inner and outer soles and caused to register with the depression 78 in the last bottom.

When the shoe is subjected to pressure in the mold, the upward pressure of the relatively heavy outer sole against the pad forces the latter upwardly and causes the thin inner sole to bulge, as indicated at 80, upwardly into the depression 78 of the last. When the adhesive between the inner and outer sole is set, it retains this bulge 80 in permanent form, thus forming a hump on the inner surface of the inner sole at that point at which the arch support is desired. This hump does not break the continuity of the inner sole, although providing the proper support for the metatarsal arch of the foot, and it does not produce any deformation of the outer sole. While this type of arch support is very efficient, it does not necessitate any change in the ordinary shape or in the usual preparation of the inner and outer soles and adds but very little to the cost of production.

While I have herein described one desirable embodiment of apparatus for use in the performance of my present process which is desirable and effective for the purpose, such apparatus is capable of modification both in size and proportion of parts, in the relative arrangement of parts, and in the substitution of equivalents for the elements here shown without departing from the spirit of the invention.

I claim:

1. Apparatus of the class described comprising a mold support having a guideway and a socket mounted horizontally at one end of and facing the guideway, said socket constituting the delivery end of a compressed air supply pipe, a mold movable along the guideway for alinement with respect to said socket, said mold having an inflatable pad, and an air inlet nipple for the pad, said nipple entering said socket when the mold is disposed adjacent to the inner end of the guideway.

2. Apparatus of the class described comprising a fixed mold support having a dovetailed guideway and a socket at one end of the guideway, said socket constituting the delivery terminal of a compressed air supply pipe, and a portable mold having a part interengageable with said guideway whereby temporarily to hold the mold in operative position, the mold comprising an inflatable pad and an air inlet tube projecting from the pad and engageable with said socket when the mold is at the inner end of the guideway, said inlet tube having a normally closed valve.

3. Apparatus of the class described comprising an inflatable pad for supporting the sole of a shoe, means for clamping a shoe agains the pad with substantially the entire sole of the shoe disposed over the pad, and guard means between the pad and the heel seat for preventing the pad, when inflated, from projecting above the edge of the sole at the heel seat portion thereof.

4. Apparatus of the class described comprising a shoe mold having a base provided with a cavity for the reception of an inflatable pad, the bottom of the cavity, in vertical longitudinal section, substantially conforming to the longitudinal contour of a shoe last bottom, and a top member similar, in vertical longitudinal section, to the bottom of the cavity, said top member having an aperture for the exposure of the pad.

5. Apparatus of the class described comprising a shoe mold having a cavity provided with a cavity for the reception of an inflatable pad, and an apertured rigid plate secured to the base and confining the pad in the cavity, said plate projecting inwardly over said pad and constraining the upper surface of the pad, when inflated, to conform substantially to the longitudinal contour of the bottom of a shoe last, the aperture being conformed generally to the marginal outline of the forepart of the shoe.

6. Apparatus of the class described comprising a mold having an inflatable pressure applying pad, means for clamping a shoe against the pad with substantially the entire sole of the shoe disposed over the pad, and means disposed between the pad and the heel seat preventing the pad from exerting substantial pressure against the heel seat portion of the shoe sole.

7. Apparatus of the class described comprising an inflatable pad for supporting the sole of a shoe, a base member partially enclosing the pad, means for clamping a shoe against the pad, and a rigid guard member mounted on said base member approximately on the level of such shoe sole covering the marginal portion of the pad, the guard having an aperture to expose the central part of the pad, said guard having an adjustable section mounted on said base member and movable toward said guard member permitting variation in the size of the aperture.

8. Apparatus of the class described comprising an inflatable pad for supporting the sole of a shoe, means for clamping a shoe against the pad, and an apertured guard member overlying the pad, said guard member having an adjustable heel seat portion.

9. Apparatus of the class described having an inflatable pressure pad comprising a fluid-tight bag, sheets of flexible protective material engaging the upper and lower surfaces respectively of the bag, a strip of protective material extending along the lateral surface of the bag and with its edges tucked between the bag and the upper and lower protective sheets, and means independent of said strip uniting the margins of the upper and lower protective sheets.

10. Apparatus of the class described comprising a shoe mold having a base provided with a cavity for the reception of an inflatable pad, an inflatable pad disposed within said cavity, and an apertured rigid plate secured to the base and confining a portion of the pad in the cavity, said plate projecting inwardly over said pad and constraining the upper surface of the pad, when inflated, to conform substantially to the longitudinal contour of the bottom of the shoe last, and a plate slidably mounted on said base and adapted to be moved over another portion of the pad to protect the heel seat of the shoe from the pressure of the pad when clamped thereon.

11. Apparatus of the class described comprising a mold support having a guideway provided with overhanging flanges at its opposite sides, a mold having a foot slidable along said guideway and beneath said flanges, said mold comprising an inflatable pad, and means for supplying the pad with compressed air when the foot occupies a predetermined part of the guideway.

12. Apparatus of the class described comprising a fixed mold support having a dovetailed guideway and a socket at one end of the guideway, said socket constituting the delivery terminal of a compressed air supply pipe, a portable mold having a part interengageable with said guideway whereby temporarily to hold the mold in operative position, the mold comprising an inflatable pad, an air inlet tube projecting from the pad and engageable with said socket when the mold is at the inner end of the guideway, a valve in the air supply pipe, and means for actuating said valve at will.

13. Apparatus of the class described comprising a fixed mold support having a guideway and a socket at one end of the guideway, said socket constituting the delivery terminal of a compressed air supply pipe, a mold having a part interengageable with said guideway whereby temporarily to hold the mold in operative position, the mold comprising an inflatable pad, an air inlet nipple connected to the pad and engageable with said socket when the mold is at the inner end of the guideway, said inlet nipple being at one end of the mold, and an air outlet valve at the opposite end of the mold.

14. Apparatus of the class described comprising a portable mold having an inflatable pressure applying pad, means for clamping a shoe against the pad with substantially the entire sole of the shoe disposed on the pad, and means preventing the pad from exerting substantial pressure against the heel seat portion of the shoe sole.

15. Apparatus of the class described comprising a portable mold having an inflatable pressure applying pad, means for clamping a shoe against the pad with substantially the entire sole of the shoe disposed on the pad, and means interposed between the rear part of the pad and the heel seat portion of the shoe sole to protect the rear part of the sole from pressure.

16. Apparatus of the class described comprising an inflatable pad for supporting the sole of a shoe, means for clamping a shoe against the pad, with substantially the entire sole of the shoe disposed over the pad, and rigid guard means between the pad and the heel seat for protecting the edge portion of the heel seat from being rounded or broken when the pad is inflated.

17. In a machine for cement-attaching soles to shoes, the combination of a vessel having a flabby wall exposed to receive a shoe sole, means for distorting said wall to apply pressure to the sole, and a plate mounted approximately on the level of such shoe sole for adjustment so as to extend more or less over the surface of said wall to vary the exposed area and to control the distortion of said wall.

18. In a machine for cement-attaching soles to shoes, the combination of a box, a flexible vessel filling said box and having a flabby wall exposed to receive a shoe sole, means for distorting the exposed wall to apply pressure to the sole, and a plate mounted for adjustment over an end portion of the surface of said wall for insertion between said wall and the heel seat of the shoe.

19. In a machine for cement-attaching soles to shoes, the combination of a box, a flexible vessel filling said box and having one wall exposed to receive a shoe sole, means for distorting the exposed wall outwardly to apply pressure to the sole, and a plate arranged at an end of the box approximately on the level of such shoe sole for adjustment lengthwise of the box over the surface of said exposed wall to reduce the exposed area and to control distortion of the wall.

20. Apparatus of the class described comprising a mold having a pressure applying pad, means for clamping a shoe against the pad with substantially the entire sole of the shoe disposed thereon, means for pressing said pad toward the sole, and means interposed between the rear part of the pad and the heel seat portion of the shoe to protect the rear part of the sole from pressure.

WILLIAM H. BRESNAHAN.